US006252878B1

(12) United States Patent
Locklear, Jr. et al.

(10) Patent No.: US 6,252,878 B1
(45) Date of Patent: Jun. 26, 2001

(54) SWITCHED ARCHITECTURE ACCESS SERVER

(75) Inventors: Robert H. Locklear, Jr.; Craig S. Cantrell; Kip R. McClanahan; William K. Brewer; Anthony J. P. Carew, all of Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/960,590

(22) Filed: Oct. 30, 1997

(51) Int. Cl.$^7$ .................................................. H04L 12/28
(52) U.S. Cl. .............................................. 370/401; 370/400
(58) Field of Search ................................... 370/400, 401, 370/403, 404, 409, 464, 465, 466, 467, 498

(56) References Cited

U.S. PATENT DOCUMENTS

| 3,532,827 | 10/1970 | Ewin ........................................ 179/18 |
| 3,821,484 | 6/1974 | Stemung et al. .................. 179/18 EB |
| 4,002,849 | 1/1977 | Kotler et al. ...................... 179/18 EB |
| 4,282,408 | 8/1981 | Stauers ............................. 179/18 FA |
| 4,438,511 | 3/1984 | Baran ...................................... 370/19 |
| 4,665,514 | 5/1987 | Ching et al. ............................ 370/60 |
| 4,679,227 | 7/1987 | Hughes-Hartogs ..................... 379/98 |
| 4,731,816 | 3/1988 | Hughes-Hartogs ..................... 379/98 |
| 4,757,495 | 7/1988 | Decker et al. .......................... 370/76 |
| 4,771,425 | 9/1988 | Baran et al. ........................... 370/85 |
| 4,782,512 | 11/1988 | Hutton ................................... 379/98 |
| 4,819,228 | 4/1989 | Baran et al. ........................... 370/85 |
| 4,833,706 | 5/1989 | Hughes-Hartogs ..................... 379/98 |
| 4,903,261 | 2/1990 | Baran et al. ......................... 370/94.2 |
| 4,980,897 | 12/1990 | Decker et al. .......................... 375/38 |
| 4,985,889 | 1/1991 | Frankish et al. ..................... 370/94.1 |
| 5,020,058 | 5/1991 | Holden et al. ......................... 370/109 |
| 5,025,469 | 6/1991 | Bingham ................................ 379/98 |
| 5,054,034 | 10/1991 | Hughes-Hartogs ....................... 375/8 |
| 5,059,925 | 10/1991 | Weisbloom ........................... 331/1 A |
| 5,072,449 | 12/1991 | Enns et al. .......................... 371/37.1 |
| 5,088,032 | 2/1992 | Bosack ................................. 395/200 |
| 5,115,431 | 5/1992 | Williams et al. .................... 370/94.1 |
| 5,119,402 | 6/1992 | Ginzburg et al. ....................... 375/17 |
| 5,119,403 | 6/1992 | Krishnan ................................ 375/39 |
| 5,128,945 | 7/1992 | Enns et al. .......................... 371/37.1 |
| 5,134,611 | 7/1992 | Steinka et al. ......................... 370/79 |
| 5,185,763 | 2/1993 | Krishnan ................................ 735/39 |
| 5,198,818 | 3/1993 | Samueli et al. ...................... 341/144 |
| 5,202,884 | 4/1993 | Close et al. ......................... 370/94.1 |
| 5,206,886 | 4/1993 | Bingham ................................ 375/97 |
| 5,210,530 | 5/1993 | Kammerer et al. ............. 340/825.08 |
| 5,214,650 | 5/1993 | Renner et al. ...................... 370/110.1 |
| 5,222,077 | 6/1993 | Krishnan ................................ 375/39 |

(List continued on next page.)

FOREIGN PATENT DOCUMENTS 6376648   4/1988   (JP) .............................. H04L/11/20

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug. 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep. 1994, Germany, pp. 1–28 (with English translation).

*Primary Examiner*—Douglas Olms
*Assistant Examiner*—Ricardo M. Pizarro
(74) *Attorney, Agent, or Firm*—Baker Botts L.L.P.

(57) ABSTRACT

A communication system includes an access server that communicates information between a wide area network (WAN) and a local area network (LAN). The access server includes a WAN interface, a switch fabric, a number of route processors, and a LAN interface. The switch fabric directs information from the WAN interface to a selected route processor based on its loading characteristics.

53 Claims, 5 Drawing Sheets

U.S. PATENT DOCUMENTS

| | | | |
|---|---|---|---|
| 5,224,099 | 6/1993 | Corbalis et al. | 370/94.2 |
| 5,228,062 | 7/1993 | Bingham | 375/97 |
| 5,247,347 | 9/1993 | Litteral et al. | 358/85 |
| 5,255,291 | 10/1993 | Holden et al. | 375/111 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,282,155 | 1/1994 | Jones | 364/724.19 |
| 5,285,474 | 2/1994 | Chow et al. | 375/13 |
| 5,293,402 | 3/1994 | Crespo et al. | 735/14 |
| 5,295,159 | 3/1994 | Kerpez | 735/38 |
| 5,313,454 | 5/1994 | Bustini et al. | 370/13 |
| 5,317,562 | 5/1994 | Nardin et al. | 370/16 |
| 5,331,670 | 7/1994 | Sorbara et al. | 375/111 |
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa | 370/13 |
| 5,359,592 | 10/1994 | Corbalis et al. | 370/17 |
| 5,367,540 | 11/1994 | Kakuishi et al. | 375/103 |
| 5,371,532 | 12/1994 | Gelman et al. | 348/7 |
| 5,379,441 | 1/1995 | Wantanabe et al. | 395/800 |
| 5,390,239 | 2/1995 | Morris et al. | 379/93 |
| 5,394,394 | 2/1995 | Crowther et al. | 370/60 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,523 | 4/1995 | Ikehata et al. | 379/98 |
| 5,408,527 | 4/1995 | Tsutsu | 379/211 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,412,660 | 5/1995 | Chen et al. | 370/110.1 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,422,880 | 6/1995 | Heitkamp et al. | 370/60 |
| 5,426,637 * | 6/1995 | Derby | 370/401 |
| 5,428,608 | 6/1995 | Freeman et al. | 370/60.1 |
| 5,430,715 | 7/1995 | Corbalis et al. | 370/54 |
| 5,434,863 | 7/1995 | Onishi et al. | 370/85.13 |
| 5,440,335 | 8/1995 | Beveridge | 348/13 |
| 5,442,390 | 8/1995 | Hooper et al. | 348/7 |
| 5,444,703 | 8/1995 | Gagliardi et al. | 370/60.1 |
| 5,452,306 | 9/1995 | Turudic et al. | 370/110.1 |
| 5,453,779 | 9/1995 | Dan et al. | 348/7 |
| 5,461,415 | 10/1995 | Wolf et al. | 348/7 |
| 5,461,616 | 10/1995 | Suzuki | 370/79 |
| 5,461,624 | 10/1995 | Mazzola | 370/85.13 |
| 5,461,640 | 10/1995 | Gatherer | 375/231 |
| 5,469,495 | 11/1995 | Beveridge | 379/56 |
| 5,473,599 | 12/1995 | Li et al. | 370/16 |
| 5,473,603 * | 12/1995 | Iwata | 370/426 |
| 5,473,607 | 12/1995 | Hausman et al. | 370/85.13 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,495,483 | 2/1996 | Grube et al. | 370/95.1 |
| 5,509,006 | 4/1996 | Wilford et al. | 370/60 |
| 5,513,251 | 4/1996 | Rochkind et al. | 379/93 |
| 5,517,488 | 5/1996 | Miyazaki et al. | 370/16 |
| 5,519,704 | 5/1996 | Farinacci et al. | 370/85.13 |
| 5,528,585 | 6/1996 | Cooley et al. | 370/56 |
| 5,546,379 | 8/1996 | Thaweethai et al. | 370/17 |
| 5,555,244 | 9/1996 | Gupta et al. | 370/60.1 |
| 5,561,663 | 10/1996 | Klausmeier | 370/17 |
| 5,561,669 | 10/1996 | Lenney et al. | 370/60.1 |
| 5,570,360 | 10/1996 | Klausmeier et al. | 370/60 |
| 5,574,724 | 11/1996 | Bales et al. | 370/68.1 |
| 5,583,862 | 12/1996 | Callon | 370/397 |
| 5,583,872 | 12/1996 | Albrecht et al. | 370/476 |
| 5,588,003 * | 12/1996 | Ohba | 370/468 |
| 5,598,406 | 1/1997 | Albrecht et al. | 370/296 |
| 5,598,581 | 1/1997 | Daines et al. | 395/872 |
| 5,602,902 | 2/1997 | Satterlund et al. | 379/59 |
| 5,604,741 | 2/1997 | Samucli et al. | 370/402 |
| 5,612,957 | 3/1997 | Gregerson et al. | 370/401 |
| 5,617,417 | 4/1997 | Sathe et al. | 370/394 |
| 5,617,421 | 4/1997 | Chin et al. | 370/402 |
| 5,631,897 | 5/1997 | Pacheco et al. | 370/237 |
| 5,666,353 | 9/1997 | Klausmeier et al. | 370/230 |
| 5,668,857 | 9/1997 | McHale | 379/93.07 |
| 5,673,265 | 9/1997 | Gupta et al. | 370/432 |
| 5,678,004 | 10/1997 | Thaweethai | 595/187.01 |
| 5,687,176 | 11/1997 | Wisniewski et al. | 370/476 |
| 5,691,997 | 11/1997 | Lackey, Jr. | 371/53 |
| 5,729,546 | 3/1998 | Gupta et al. | 370/434 |
| 5,732,079 | 3/1998 | Castrigno | 370/362 |
| 5,737,364 | 4/1998 | Cohen et al. | 375/220 |
| 5,737,526 | 4/1998 | Periasamy et al. | 395/200.06 |
| 5,737,635 | 4/1998 | Daines et al. | 395/872 |
| 5,740,171 | 4/1998 | Mazzola et al. | 370/392 |
| 5,740,176 | 4/1998 | Gupta et al. | 370/440 |
| 5,742,604 | 4/1998 | Edsall et al. | 370/401 |
| 5,742,649 | 4/1998 | Muntz et al. | 375/371 |
| 5,756,280 | 5/1998 | Soora et al. | 455/4.2 |
| 5,764,636 | 6/1998 | Edsall | 370/401 |
| 5,764,641 | 6/1998 | Lin | 370/412 |
| 5,765,032 | 6/1998 | Valizadeh | 395/200.65 |
| 5,770,950 | 6/1998 | Zurcher et al. | 326/30 |
| 5,781,617 | 7/1998 | McHale et al. | 379/93.14 |
| 5,787,070 | 7/1998 | Gupta et al. | 370/217 |
| 5,787,255 | 7/1998 | Parlan et al. | 395/200.63 |
| 5,793,763 | 8/1998 | Mayes et al. | 370/389 |
| 5,793,978 | 8/1998 | Fowler | 395/200.56 |
| 5,796,732 | 8/1998 | Mazzola et al. | 370/362 |
| 5,799,017 | 8/1998 | Gupta et al. | 370/419 |
| 5,802,042 | 9/1998 | Natarajan et al. | 370/255 |
| 5,805,595 | 9/1998 | Sharper et al. | 370/442 |
| 5,812,618 | 9/1998 | Muntz et al. | 375/372 |
| 5,812,786 | 9/1998 | Seazholtz et al. | 395/200.63 |
| 5,822,383 | 10/1998 | Muntz et al. | 375/362 |
| 5,835,036 | 11/1998 | Takefman | 341/95 |
| 5,835,481 | 11/1998 | Akyol et al. | 370/216 |
| 5,835,494 | 11/1998 | Hughes et al. | 370/397 |
| 5,835,725 | 11/1998 | Chiang et al. | 395/200.58 |
| 5,838,915 | 11/1998 | Klausmeier et al. | 395/200.45 |
| 5,838,994 | 11/1998 | Valizadeh | 395/876 |
| 5,852,655 | 12/1998 | McHale et al. | 379/93.14 |
| 5,859,550 | 1/1999 | Brandt | 327/156 |
| 5,864,542 | 1/1999 | Gupta et al. | 370/257 |
| 5,867,666 | 2/1999 | Harvey | 395/200.68 |
| 5,905,781 * | 5/1999 | McHale | 370/93.14 |
| 6,069,895 * | 5/2000 | Ayandeh | 370/399 |

* cited by examiner

FIG. 3A

| SESSION ID 200 | RP ID 202 | ADDRESS 203 | MAPPING 204 |
|---|---|---|---|
| 1 | 1 | 127.34967 | 1 → 1 |
| 2 | 2 | 36.19268 | 1 → 2 |
| 3 | 1 | 226.08962 | 2 → 1 |
| ⋮ | ⋮ | ⋮ | ⋮ |
| n | 4 | 99.00001 | 2 → 4 |

| RP 202 | PACKET RATE (kmps) 212 | ERROR RATE (kmps) 214 | SESSION COUNT 216 | IDLE TIME MEASURE (ms) 218 |
|---|---|---|---|---|
| 1 | 43 | 0.4 | 41 | 1 |
| 2 | 12 | 0.1 | 8 | 2 |
| 3 | 5 | 0.0 | 2 | 8 |
| 4 | 27 | 0.2 | 23 | 3 |

| SESSION ID 200 | MAPPING 222 | ADDRESS 224 | ROUTING 226 |
|---|---|---|---|
| 1 | 1 → 3 | 127.48.37.12 | — |
| 2 | 2 → 1 | joe@net | {NODE 1} |
| 3 | 1 → 4 | www.netspeed.com | — |
| ⋮ | ⋮ | ⋮ | ⋮ |
| n | 4 → 2 | betty.netspeed | {NODE 3} |

↙ 130

SWITCHED ARCHITECTURE ACCESS SERVER

TECHNICAL FIELD OF THE INVENTION

This invention relates in general to data communication, and more particularly to a switched architecture access server.

BACKGROUND OF THE INVENTION

A router provides communication between two different networks. For example, a router may allow communication between a wide area network (WAN) and a local area network (LAN). Depending on the particular application, routers perform a variety of termination, conversion, segmentation, reassembly, and addressing functions.

Existing routers are termination devices that terminate information communicated using a WAN protocol, such as asynchronous transfer mode (ATM). The router converts and routes the received information to a destination using a LAN protocol, such as Ethernet. The termination and subsequent routing of information is a processor-intensive activity that often degrades the quality of service or bandwidth available to network users. Continuing bandwidth demands from bursty traffic, the proliferation of high bandwidth applications like real-time video, and the overall increased use of data communication networks exacerbates this problem. Existing routers fail to provide modularity and scalability to accommodate these increased demands for fast and reliable data service.

SUMMARY OF THE INVENTION

In accordance with the present invention, the disadvantages and problems associated with routers have been substantially reduced or eliminated. In particular, the present invention includes an access server with a switch fabric that directs information to a selected route processor based on its loading characteristics.

In accordance with one embodiment of the present invention, a communication system includes a communication server coupled to a communication device using a subscriber line that forms a local loop between the communication device and the communication server. An access server, coupled to the communication server using a data network, includes a switch fabric coupled to a number of route processors. The switch fabric directs information from the communication device to a selected route processor based on its loading characteristics.

In accordance with another embodiment of the present invention, an access server includes a first network interface to receive information associated with a session. The access server also includes a number of route processors, each route processor having a loading characteristic indicating its level of activity. A switch fabric has a first port and a number of second ports. The first port of the switch fabric couples to the first network interface, and each second port of the switch fabric couples to an associated route processor. The switch fabric couples information associated with a session to a selected route processor based on its loading characteristics.

Important technical advantages of the present invention include an access server that provides communication between a first network and a second network using a switch fabric and a number of route processors. In a particular embodiment, the first network is a WAN that supports asynchronous transfer mode (ATM) communication and the second network is a LAN that supports Ethernet communication. The switch fabric routes, switches, and/or directs information associated with data sessions to a number of route processors based on their loading characteristics. The loading characteristics may include a packet rate, error rate, session count, idle time, or other measure that indicates the level of activity of each route processor.

Another important technical advantage of the present invention includes the establishment and efficient handling of information associated with sessions. The switch fabric identifies sessions, establishes mappings and virtual channels, and switches information to selected route processors using high bandwidth techniques, such as ATM cell routing. A number of separate route processors perform processor-intensive LAN packet assembly, authentication, and routing depending on their current loading characteristics. The access server can upgrade or add route processors in a modular and scalable fashion to accommodate more sessions and higher bandwidth use of the access server. The switch fabric, therefore, provides a load balancing, traffic segmentation, and session management function not found in traditional routers.

Further technical advantages of the present invention include a LAN interface that provides a switching function to segment traffic communicated to devices serviced by the LAN. In addition, the LAN interface also directs traffic received from devices serviced by the LAN to selected route processors. In a particular embodiment, the WAN interface, switch fabric, route processors, and LAN interface all reside in a single housing. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIGS. 3A through 3C illustrate information maintained by the access server;

DETAILED DESCRIPTION OF THE INVENTION

Figure 1:
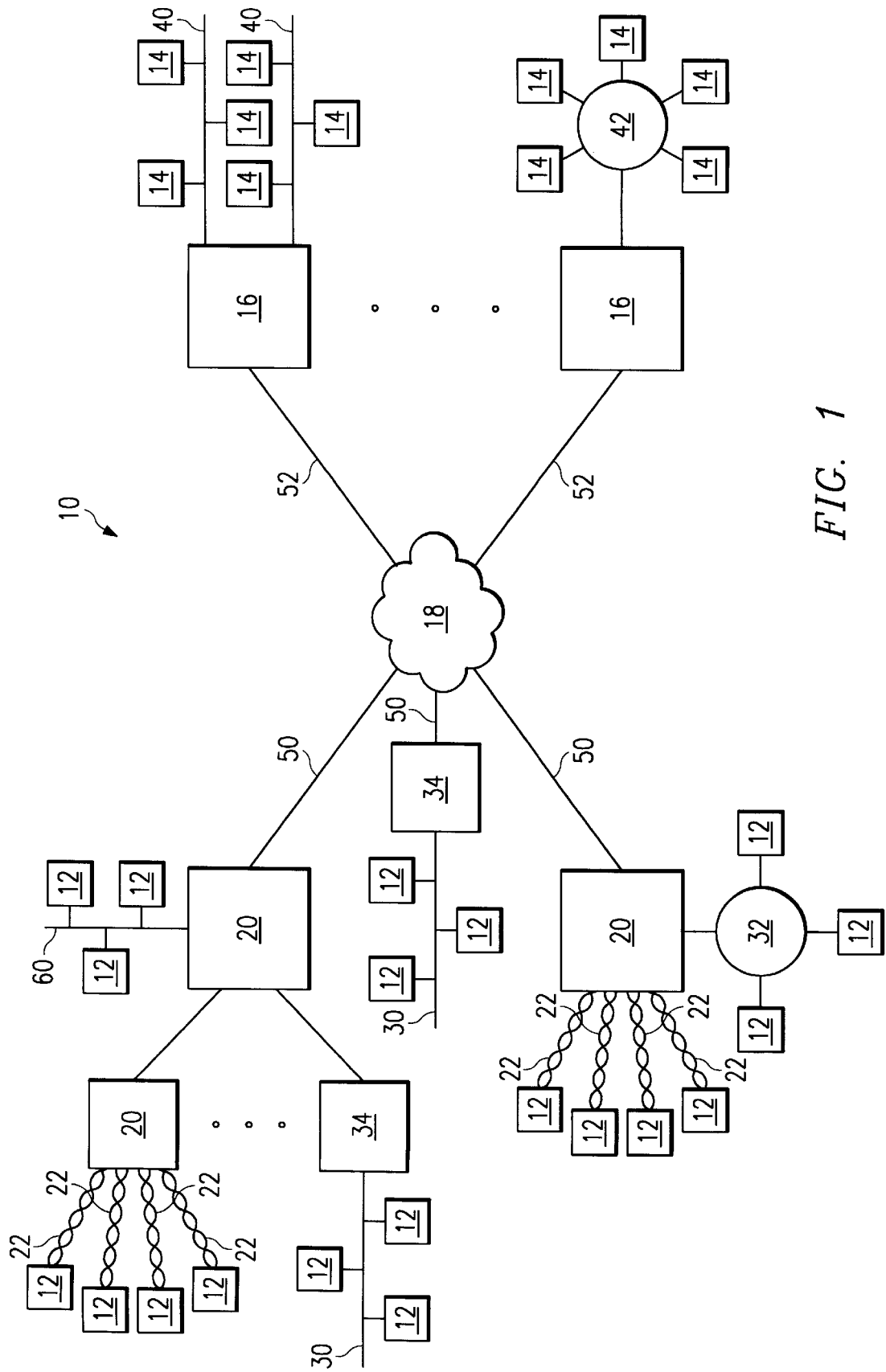
FIG. 1 illustrates a communication system 10 that includes an access server in accordance with the present invention.

FIG. 1 illustrates a communication system 10 that provides communication between communication devices 12 and 14. More particularly, communication system 10 includes an access server 16 that provides devices 14 access to data network 18.

Devices 12 couple to data network 18 using a number of different devices and techniques. In one embodiment, devices 12 couple to a communication server 20 in the local loop using traditional twisted pair subscriber lines 22. Devices 12 and communication server 20 exchange information using high bandwidth digital subscriber line technology, referred to generally as XDSL. Communication server 20 may reside at a central office, remote terminal, or other access point in communication system 10 that allows coupling to local loops formed by twisted pair subscriber lines 22. U.S. patent application Ser. No. 08/625,769 entitled "Communication Server Apparatus and Method" discloses in detail the operation of devices 12 and communication server 20 in communication system 10, and is hereby incorporated by reference for all purposes.

Devices 12 may also be associated with a local area network (LAN), such as an Ethernet network 30, a token ring network 32, a fiber distributed data interface (FDDI) network, an asynchronous transfer mode (ATM) network 60, or any other association or arrangement of devices 12 in a network environment (referred to generally as LAN 30). LAN 30 supports Ethernet (10 Mbps), Fast Ethernet (100 Mbps), Gigabit Ethernet, switched Ethernet, or any other suitable networking protocol or technology. LAN 30 couples to data network 18 using communication server 20, network interface 34, or any combination of communication server 20 and network interface 34. In one embodiment, network interface 34 comprises hubs, routers, bridges, gateways, and other suitable communication devices and related software that support suitable communication protocols to couple LAN 30 to data network 18.

Data network 18 supports communication between communication server 20, network interface 34, and access server 16. In a particular embodiment, data network 18 is part of a wide area network (WAN) that supports a suitable communication technology, such as ATM, frame relay, X.25 packet switching, statistical multiplexers, switched multi-megabit data service (SMDS), high-level data link control (HDLC), serial line Internet protocol (SLIP), point-to-point protocol (PPP), transmission control protocol/Internet Protocol (TCP/IP) or other suitable WAN protocol or technology. Although the discussion below focuses on a particular ATM embodiment of data network 18, communication system 10 contemplates any suitable WAN protocol or technology.

Devices 14, like devices 12, may be arranged in a LAN, such as an Ethernet network 40, a token ring network 42, an FDDI network, or other suitable network or arrangement of devices 14 (referred to generally as LAN 40). LAN 40 supports the same protocol and technology as LAN 30. As described in more detail below with reference to FIGS. 2 through 5, access server 16 provides communication between the WAN supported by data network 18 and LAN 40.

In operation, device 12 using twisted pair subscriber lines 22 or LAN 30 generates information to indicate initiation of a session, and passes this information to communication server 20 and/or network interface 34. Data network 18 receives this information using link 50 and passes this information to access server 16 using link 52. Access server 16 then establishes a session and supports subsequent communication between devices 12 and 14.

Figure 2:
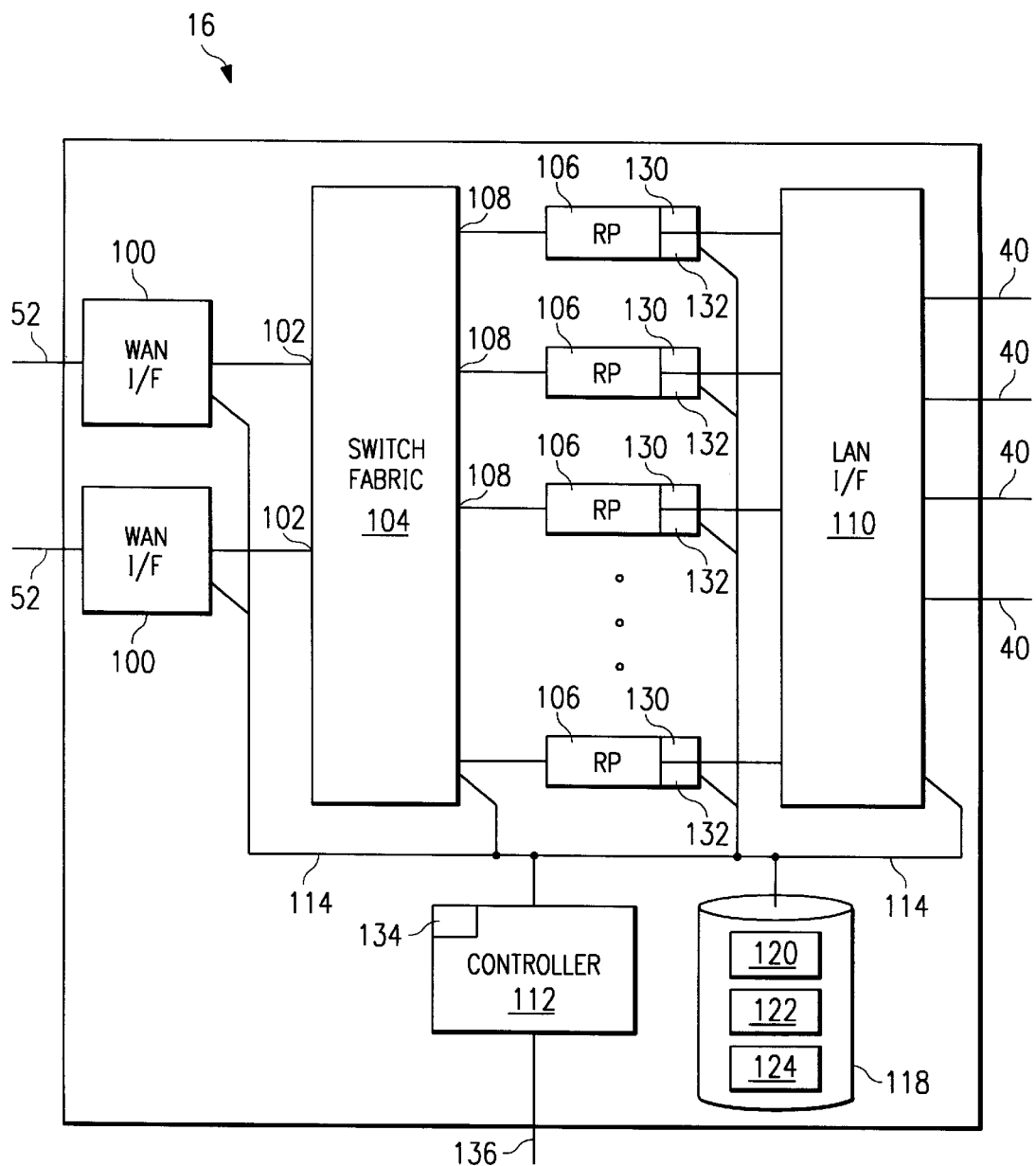
FIG. 2 illustrates in more detail the access server.

FIG. 2 illustrates in more detail access server 16. Links 52 of data network 18 couple to one or more WAN interfaces 100. Each WAN interface 100 couples to an associated first port 102 of switch fabric 104. A number of route processors (RP) 106 couple to second ports 108 of switch fabric 104. Route processors 106 also couple to LAN interface 110, which in turn couples to LANs 40 servicing devices 14. In a particular embodiment, WAN interface 100, switch fabric 104, route processors 106, and LAN interface 110 reside in a single housing, rack mount, or other arrangement of integrated or separate components at a single location in communication system 10.

A controller 112 manages the overall operation of access server 16. Controller 112 exchanges commands, operating statistics, and other information with components of access server 16 using bus 114. A database 118 coupled to controller 112 stores program instructions 120, session table 122, and loading table 124. WAN interface 100, switch fabric 104, route processor 106, and LAN interface 110 access database 118 directly using bus 114 or indirectly using controller 112. Alternatively, information maintained in database 118 may reside in different components of access server 16 or in components external to access server 16. For example, switch fabric 104 may store one or more items maintained in session table 122 and/or loading table 124 locally.

Program instructions 120 include software code, parameters, and other instructions and data structures that controller 112 accesses and executes to control the operation of access server 16. Session table 122 maintains information regarding sessions handled by access server 16, and loading table 124 maintains information regarding the loading characteristics of route processors 106. Both session table 122 and loading table 124 are discussed in more detail with reference to FIGS. 3A and 3B.

Each route processor 106 maintains a routing table 130 and a client function 132. Routing table 130 maintains information that allows route processor 106 to route information between LAN 40 using LAN interface 110 and WAN 52 using WAN interface 100. Client function 132 collects and communicates information regarding the operation of route processor 106 to controller 112 using bus 114. In general, route processors 106 perform termination, conversion, segmentation, reassembly, addressing, and other functions supported by routers, bridges, gateways, multiplexers, and other WAN and LAN networking devices.

A server function 134 supported by controller 112 or an external server function accessed using link 136 uses information regarding the operation of route processor 106 to provide accounting and authentication services to access server 16. Both routing table 130 and client function 132 reside at route processor 106 as shown in FIG. 2, in controller 112, database 118, other components of access server 16, and/or in remote components accessible by link 136.

WAN interface 100 and switch fabric 104 operate using the WAN protocol supported by data network 18, whereas LAN interface 110 operates using the LAN protocol supported by LAN 40. Route processors 106 provide termination of the WAN protocol, assembly, and/or conversion into a LAN protocol, authentication and error correction, and subsequent routing in the LAN protocol to device 14. These operations performed by route processor 106 are processor-intensive and, in traditional routers, introduce a potential source of degradation in communication bandwidth.

To ameliorate or eliminate this degradation, switch fabric 104 balances the load on route processors 106 using loading characteristics that indicate the level of activity of route processors 106. This is performed by establishing sessions and, in one embodiment, assigning a virtual channel to each session. Switch fabric 104 then operates in a high bandwidth WAN protocol and efficiently communicates information to selected route processors 106 based on the establishment of a session. As the session count increases and applications require greater bandwidth, access server 16 may upgrade or add route processors 106 to accommodate increased demands. Therefore, switch fabric 104 establishes sessions to balance the load on route processors 106, which in turn ensures optimal and efficient provisioning of communication services by access server 16.

In operation, access server 16 receives a message indicating the initiation of a session on link 52 in a first protocol, for example, a WAN protocol such as ATM. WAN interface 100 communicates the message to an associated port 102 of switch fabric 104. Switch fabric 104, either independently or with the assistance of controller 112, accesses loading table 124 in database 118. Switch fabric 104 then selects a route processor 106 based on its loading characteristics and/or the loading characteristics of the other route processors 106 in access server 16, as indicated in loading table 124. Switch fabric 104 then establishes a session and assigns an address (e.g., virtual path, virtual channel) to be used in future communications associated with the session. Switch fabric 104 and/or controller 112 store session, address, and mapping information in session table 122. Access server 16 acknowledges establishment of a session by sending a message using WAN interface 100 and link 52 to inform the originating device 12 of the establishment of a session and the address to be used in future communications. Before, after, or during the storage of information in session table 122 and the acknowledgment of the establishment of a session, switch fabric 104 directs, couples, and/or switches the message to the selected route processor 106.

Switch fabric 104 directs subsequent communications from originating device 12 that include the address associated with the established session to the assigned route processor 106. Route processor 106 then performs reassembly, conversion, authentication, error correction, and other suitable functions, and routes the message to destination device 14 using LAN interface 110 and LAN 40. During the operation of access server 16, client functions 132 collect and report loading characteristics of route processors 106 for storage in loading table 124. Also, route processors 106 modify or update information maintained in routing tables 130 based on information received from LAN 40 concerning its operation, malfunction, or new network configuration.

During a session handled by access server 16, device 14 may communicate information to device 12. LAN interface 110 receives this information from LAN 40 and, based on information maintained in session table 122 or routing table 130, routes this information to route processor 106 associated with the session. Route processor 106 then performs segmentation, conversion, and other functions to prepare information for routing by switch fabric 104, WAN interface 100, and other components of communication system 10 to device 12.

Access server 16 establishes sessions originating from device 14 in a similar manner as sessions originating from device 12. LAN interface 110 receives a message from device 14 indicating the initiation of a session and selects route processor 106 based on loading characteristics maintained in loading table 124. Access server 16 assigns a session and associated address to be used in subsequent communications associated with the session. Controller 112 and/or LAN interface 110 store session, address, and mapping information in session table 122, and acknowledge the establishment of a session by sending a message to device 14 using LAN 40.

FIGS. 3A through 3C illustrate the contents of session table 122, loading table 124, and routing table 130 stored in database 118 of access server 16. Referring to FIG. 3A, each entry in session table 122 includes a session ID 200, a route processor ID 202, an address 203, and mapping information 204. Session ID 200 is a unique or different designator assigned to each session currently handled by access server 16. Upon creation of a new session, access server 16 assigns a new session ID 200 and creates a new entry in session table 122. Upon the expiration of a session (e.g., time-out, user termination, equipment malfunction) access server 16 removes the entry in session table 122 associated with the particular session ID 200.

Route processor ID 202 identifies route processor 106 selected for the particular session as a result of loading characteristics maintained in loading table 124. Address 203 represents the address used by access server 16 to identify communications associated with a session. In a particular embodiment, address 203 may include a virtual path identifier (VPI), a virtual channel identifier (VCI), identifiers for ports 102 and 108 of switch fabric 104, or any other information that identifies a circuit, connection, coupling, or association made by switch fabric 104 for each session. One particular ATM implementation includes an eight bit VPI and a sixteen bit VCI, as illustrated by addresses 203 having two numbers separated by a period. Mapping information 204 represents information used by switch fabric 104 to perform its switching function. For example, mapping information 203 may include ATM cell routing tables, identifiers for ports 102 and 108 of switch fabric 104, or other suitable mapping information.

Referring to FIG. 3B, loading table 124 contains an entry for each route processor 106 in access server 16. Each entry in loading table 124 includes a route processor ID 202, a packet rate 212, an error rate 214, a session count 216, and an idle time measure 218. Packet rate 212 may be expressed in thousands of messages per seconds (kmps) and indicates the number of messages, packets, cells, or other grouping of information (referred to collectively as messages) handled by route processor 106 each second. Error rate 214 may also be expressed in thousands of messages per second (kmps) and indicates the number of discarded, dropped, or corrupted messages received by route processor 106 each second. A high error rate 214 indicates a malfunction or high level of activity of route processor 106. Session count 216 tracks the number of sessions currently handled by each route processor 106. In a particular embodiment, access server 16 includes up to ten route processors 106 that combine to service up to five thousand sessions, with a maximum of five hundred sessions for each route processor 106. Idle time measure 218 may be expressed in milliseconds (ms) and indicates an idle time or other suitable measure that reflects the relative usage of route processor 106. Loading table 124 may include communication-based loading characteristics (e.g., packet rate 212, error rate 214, session count 216), processor-based loading characteristics (e.g., idle time measure 218), or any other loading characteristics that indicate the level of activity, malfunction, and/or capacity of route processor 106.

Now referring to FIG. 3C, routing table 130 maintains LAN routing information for each session handled by access server 16. Each entry includes a session ID 200, mapping information 222, an address 224, and routing information 226. As with session table 122, access server 16 adds and removes entries in routing table 130 as sessions are established and terminated. Mapping information 222 includes a virtual path identifier (VPI), a virtual channel identifier (VCI), identifiers for ports associated with LAN interface 110, or any other information that enables LAN interface 110 to convey information received from route processors 106 to LAN 40. In a particular embodiment, LAN interface 110 includes a switching capability that allows segmentation of LANs 40 for more efficient, modular, and fault tolerant communication. Mapping information 222 may also be used by LAN interface 110 to direct information received from devices 14 serviced by LAN 40 to the selected route processor 106 assigned to the session.

Address 224 is a numerical or textual representation of an Internet protocol (IP/IPX) address, a network/node designation, or any other address used by LAN 40 to deliver information to device 14. Route processor 106 may convert address 224 for each session into an appropriate format, depending on the particular implementation of access server 16 and LAN 40. Routing information 226 includes routing information protocol (RIP) information, open-shortest-path-first (OSPF) information, or any other suitable routing information that provides the most efficient, available, or optimum path to communicate information to device 14 in LAN 40. Routing information 226 identifies particular nodes, paths, or other intermediate devices that establish a desirable route to device 14.

Figure 4:
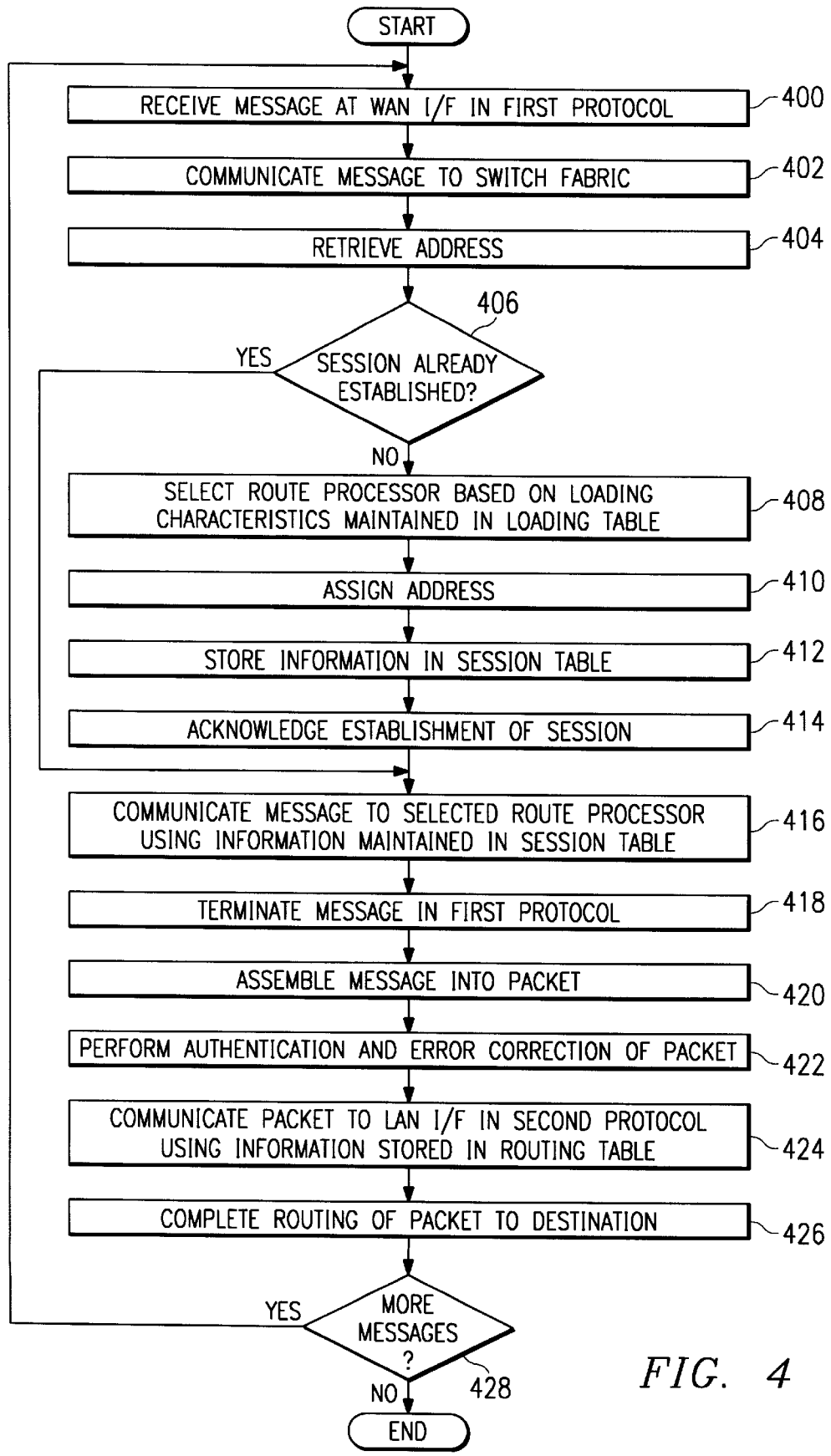
FIG. 4 is a flow chart of a method of operation of the access server.

FIG. 4 illustrates a flow chart of a method of operation of access server 16 in communication system 10. The method begins at step 400 where access server 16 receives a message at WAN interface 100 in a first protocol, such as a WAN protocol like ATM. WAN interface 100 communicates the message to an associated port 102 of switch fabric 104 at step 402. Switch fabric 104 then retrieves an address of the message at step 404. In the particular embodiment where WAN interface 100 and switch fabric 104 operate using ATM techniques, the address of the message comprises five bytes that specify, among other things, a virtual path identifier (VPI) and a virtual channel identifier (VCI).

Access server 16 determines whether a session associated with the retrieved address has already been established at step 406. This is performed by comparing the address of the message to addresses 203 maintained in session table 122. In a particular embodiment, access server 16 sets aside particular addresses 203 representing default channels to receive requests to establish a new session. If the address of the message retrieved at step 404 does not match an address 203 maintained in session table 122, then access server 16 selects a route processor 106 based on loading characteristics maintained in loading table 124 at step 408. These loading characteristics may include packet rate 212, error rate 214, session count 216, idle time measure 218, or any other loading characteristic of route processors 106. Access server 16 may consult loading characteristics of one or more route processors 106 in a random, sequential, or serial fashion to perform the selection.

Access server 16 assigns the address of the message or other available address to the session at step 410 and stores information in session table 122 based on the selected route processor 106 and selected address 203 at step 412. Access server 16 then acknowledges establishment of the session at step 414 by sending a message to device 12 that confirms establishment of a session, and informs device 12 of address 203 to be used in subsequent messages associated with the session.

If access server 16 already established the session as determined at step 406, or after access server 16 establishes the session in steps 408–414, access server 16 communicates the message to the selected route processor 106 using information maintained in session table 122 at step 416. Route processor 106 terminates the message received in the first protocol at step 418. When using ATM, route processor 106 terminates the ATM layer. Route processor 106 assembles the message into a packet or other form of information suitable for the application associated with the session at step 420. Again using ATM techniques, route processor 106 performs ATM adaptation layer (AAL) reassembly, for example, using AAL5. Route processor 106 then performs authentication and error correction of the packet at step 422.

Now in the second network protocol, such as a LAN protocol like Ethernet, route processor 106 communicates the packet to LAN interface 110 using information stored in routing table 130 at step 424. LAN interface 110 under the direction of information received from route processor 106, selects the appropriate output port to LAN 40 and completes routing of the packet to the destination device 14 at step 426. Routing performed by LAN interface 110 may include or consider various conversions of address 224 as well as routing directives included in routing information 226. If access server 16 receives more messages at step 428, then the process continues at step 400 to receive and process additional messages.

It should be understood that access server 16 may operate in a parallel and bidirectional fashion to receive and process simultaneously messages from a number of different sources to be routed to a number of different destinations. Therefore, the process illustrated by FIG. 5 represents the individual processing of a message, where in fact access server 16 processes thousands, millions, or more of these messages each second.

Figure 5:
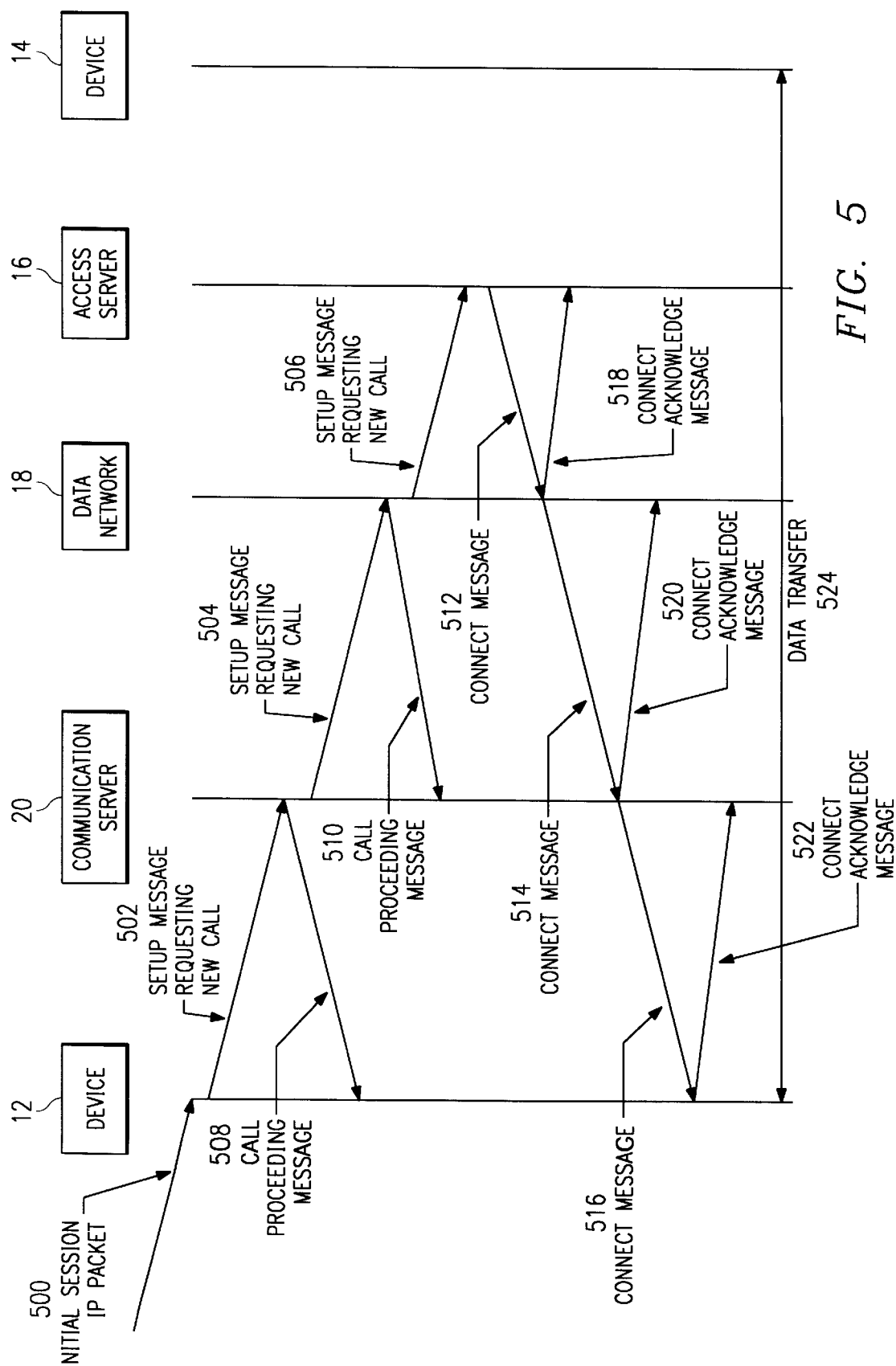
FIG. 5 illustrates signaling between different components in the communication system to establish a session using the access server.

FIG. 5 illustrates the establishment of a session in communication system 10, and specifically the signaling performed by device 12, communication server 20, data network 18, access server 16, and device 14. Although data network 18 is shown as a single messaging entity, communication system 10 contemplates a number of cascaded messaging entities as part of data network 18. For example, data network 18 represents multiple hops between many ATM switching devices to deliver signals between communication server 20 and access server 16.

An application or other process running on device 12 requests a session by generating an initial session IP packet at 500. Device 12 communicates a setup message requesting a new call to communication server 20 at 502. Communication system 10 propagates the setup message from communication server 20 to data network 18 at 504, and from data network 18 to access server 16 at 506. During the propagation of the setup message, both communication server 20 and data network 18 issue a call proceeding message or other suitable acknowledgment at 508 and 510, respectively.

Upon receiving the setup message at 506, access server 16 performs steps 408–412 (FIG. 4) to establish a session, and then communicates a session acknowledgment or connect message to data network 18 at 512. Communication system 10 propagates the connect message from data network 18 to communication server 20 at 514, and from communication server 20 to device 12 at 516. During this propagation, data network 18, communication server 20, and device 12 issue a connect acknowledge message at 518, 520, and 522, respectively. When device 12 receives the connect message at 516, communication system 10 verifies the establishment of a session and data transfer between device 12 and device 14 commences at 524.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication system, comprising:
   a communication device;
   a communication server coupled to the communication device using a subscriber line that forms a local loop between the communication device and the communication server; and an access server coupled to the communication server using a data network, the access server comprising a switch fabric coupled to a plurality of route processors, wherein the access server is operable to receive information associated with a session from the communication device, to select one of the route processors for the session based on the route processor's loading characteristics, and to communicate the information associated with the session to the selected route processor using the switch fabric.

2. The communication system of claim 1, further comprising a second communication device coupled to the access server and operable to receive information generated by the communication device from the selected route processor.

3. The communication system of claim 1, wherein the selected route processor converts information received from the communication device from a wide area network protocol to a local area network protocol.

4. The communication system of claim 1, wherein the selected route processor converts information received from the communication device from an asynchronous transfer mode protocol to an Ethernet protocol.

5. The communication system of claim 1, wherein the selected route processor terminates information in a first network protocol and routes information in a second network protocol.

6. The communication system of claim 1, wherein the communication device and the communication server communicate via the local loop using XDSL communication techniques.

7. The communication system of claim 1, wherein the loading characteristic for each route processor comprises a packet rate.

8. The communication system of claim 1, wherein the switch fabric establishes a virtual channel that indicates a coupling between the switch fabric and the selected route processor.

9. An access server, comprising:
a first network interface to receive information associated with a session;
a plurality of route processors, each route processor having a loading characteristic indicating its level of activity; and
a switch fabric having a first port and a plurality of second ports, the first port of the switch fabric coupled to the first network interface, each second port of the switch fabric coupled to an associated route processor, the switch fabric operable to select one of the route processors for the session based on the route processor's loading characteristics and to communicate the information associated with the session from the first network interface to the selected route processor.

10. The access server of claim 9, wherein the loading characteristic for each route processor comprises a packet rate.

11. The access server of claim 9, wherein the first network interface receives the information on a default channel associated with unassigned sessions.

12. The access server of claim 9, wherein the switch fabric establishes a virtual channel that indicates the coupling between the switch fabric and the selected route processor.

13. The access server of claim 9, wherein the selected route processor converts information associated with the session from a wide area network protocol to a local area network protocol.

14. The access server of claim 9, wherein the selected route processor converts information associated with the session from an asynchronous transfer mode protocol to an Ethernet protocol.

15. The access server of claim 9, wherein the first network interface, the route processors, and the switch fabric reside in a single housing.

16. The access server of claim 9, wherein the selected route processor terminates information associated with the session in a first network protocol and routes information associated with the session in a second network protocol.

17. A method for communicating information associated with a session, comprising:
receiving a message indicating the initiation of a session;
determining loading characteristics on at least one of a plurality of route processors;
selecting a route processor for the session based on the loading characteristics; and
switching the message to the selected route processor using a switch fabric.

18. The method of claim 17, wherein the step of determining loading characteristics comprises determining a packet rate.

19. The method of claim 17, wherein the step of receiving comprises receiving the message on a default channel associated with unassigned sessions.

20. The method of claim 17, further comprising the step of converting the message from a first network protocol into a second network protocol at the selected route processor.

21. The method of claim 20, wherein:
the first network protocol comprises asynchronous transfer mode; and
the second network protocol comprises Ethernet.

22. The method of claim 17, further comprising the following steps performed at the selected route processor:
terminating the message in a first network protocol;
assembling the message into a packet in a second network protocol; and
routing the packet in a second network protocol.

23. The method of claim 17, wherein the message comprises an address, and further comprising the step of switching a plurality of additional messages having the address to the selected route processor.

24. The method of claim 23, wherein the address identifies a virtual channel associated with the session.

25. The method of claim 17, wherein the switch fabric comprises an asynchronous transfer mode switch fabric.

26. A communication system, comprising:
a communication device;
a communication server coupled to the communication device using a subscriber line that forms a local loop between the communication device and the communication server; and
an access server coupled to the communication server using a data network, the access server comprising a switch fabric coupled to a plurality of route processors, wherein the access server is operable to receive information associated with a session from the communication device, to select one of the route processors for the session based on the route processor's loading characteristics, and to communicate the information associated with the session to the selected route processor using the switch fabric;
wherein the communication device and the communication server communicate via the local loop using XDSL communication techniques.

27. A communication system, comprising:

a communication device;

a communication server coupled to the communication device using a subscriber line that forms a local loop between the communication device and the communication server; and an access server coupled to the communication server using a data network, the access server comprising a switch fabric coupled to a plurality of route processors, wherein the access server is operable to receive information associated with a session from the communication device, to select one of the route processors for the session based on the route processor's packet rate, and to communicate the information associated with the session to the selected route processor using the switch fabric.

28. An access server, comprising:

a first network interface to receive information associated with a session;

a plurality of route processors, each route processor having a loading characteristic indicating its level of activity; and a switch fabric having a first port and a plurality of second ports, the first port of the switch fabric coupled to the first network interface, each second port of the switch fabric coupled to an associated route processor, the switch fabric operable to select one of the route processors for the session based on the route processor's packet rate and to communicate the information associated with the session from the first network interface to the selected route processor.

29. An access server, comprising:

a first network interface to receive information associated with a session;

a plurality of route processors, each route processor having a loading characteristic indicating its level of activity; and a switch fabric having a first port and a plurality of second ports, the first port of the switch fabric coupled to the first network interface, each second port of the switch fabric coupled to an associated route processor, the switch fabric operable to select one of the route processors for the session based on the route processor's loading characteristics and to communicate the information associated with the session from the first network interface to the selected route processor;

wherein the selected route processor converts information associated with the session from an asynchronous transfer mode protocol to an Ethernet protocol.

30. A method for communicating information associated with a session, comprising:

receiving a message indicating the initiation of a session;

determining a packet rate of at least one of a plurality of route processors;

selecting a route processor for the session based on the packet rate; and switching the message to the selected route processor using a switch fabric.

31. A method for communicating information associated with a session, comprising:

receiving a message indicating the initiation of a session;

determining loading characteristics on at least one of a plurality of route processors;

selecting a route processor for the session based on the loading characteristics;

switching the message to the selected route processor using a switch fabric; and converting the message from an asynchronous transfer mode protocol into an Ethernet protocol at the selected route processor.

32. A method for communicating information associated with a session, comprising:

receiving a message indicating the initiation of a session, the message comprising an address;

determining loading characteristics on at least one of a plurality of route processors;

selecting a route processor for the session based on the loading characteristics;

switching the message to the selected route processor using a switch fabric; and switching a plurality of additional messages having the address to the selected route processor.

33. The method of claim 32, wherein the address identifies a virtual channel associated with the session.

34. A method for communicating information associated with a session, comprising:

receiving a message indicating the initiation of a session;

determining loading characteristics on at least one of a plurality of route processors;

selecting a route processor for the session based on the loading characteristics; and switching the message to the selected route processor using an asynchronous transfer mode switch fabric.

35. Access server software embodied in a computer-readable medium and operable to perform the following steps:

receiving a message indicating an initiation of a session;

determining loading characteristics on at least one of a plurality of route processors;

selecting a route processor for the session based on the loading characteristics; and switching the message to the selected route processor using a switch fabric.

36. The access server software of claim 35, wherein the step of determining loading characteristics comprises determining a packet rate.

37. The access server software of claim 35, wherein the step of receiving the message comprises receiving the message on a default channel associated with unassigned sessions.

38. The access server software of claim 35, wherein the selected route processor converts the message from a first network protocol into a second network protocol at.

39. The access server software of claim 38, wherein:

the first network protocol comprises asynchronous transfer mode; and the second network protocol comprises Ethernet.

40. The access server software of claim 35, wherein the selected route processor terminates the message in a first network protocol, assembles the message into a packet in a second network protocol, and routes the packet in a second network protocol.

41. The access server software of claim 35, wherein the message comprises an address and the access server software is further operable to perform the step of switching a plurality of additional messages having the address to the selected route processor.

42. The access server software of claim 41, wherein the address identifies a virtual channel associated with the session.

43. The access server software of claim 35, wherein the switch fabric comprises an asynchronous transfer mode switch fabric.

44. An access server, comprising:

means for receiving a message indicating an initiation of a session;

means for determining loading characteristics on at least one of a plurality of route processors;

means for selecting a route processor for the session based on the loading characteristics; and means for switching the message to the selected route processor using a switch fabric.

45. The access server of claim 44, wherein the means for determining loading characteristics comprises means for determining a packet rate.

46. The access server of claim 44, wherein the means for receiving the message comprises means for receiving the message on a default channel associated with unassigned sessions.

47. The access server of claim 44, further comprising means for converting the message from a first network protocol into a second network protocol at the selected route processor.

48. The access server of claim 47, wherein:

the first network protocol comprises asynchronous transfer mode; and the second network protocol comprises Ethernet.

49. The access server of claim 44, wherein the selected route processor terminates the message in a first network protocol, assembles the message into a packet in a second network protocol, and routes the packet in a second network protocol.

50. The access server of claim 44, wherein the message comprises an address, and further comprising means for switching a plurality of additional messages having the address to the selected route processor.

51. The access server of claim 50, wherein the address identifies a virtual channel associated with the session.

52. The access server of claim 44, wherein the switch fabric comprises an asynchronous transfer mode switch fabric.

53. The access server of claim 9, wherein the switch fabric selects one of the route processors for the session with assistance of a controller.

* * * * *